United States Patent [19]
Gillmer

[11] 3,860,926

[45] Jan. 14, 1975

[54] HIGH COMPRESSION RATIO PULSE FORMING SYSTEM

[75] Inventor: Arnold H. Gillmer, Inglewood, Calif.

[73] Assignee: Hughes Aircraft Company, Culver City, Calif.

[22] Filed: May 16, 1960

[21] Appl. No.: 29,542

[52] U.S. Cl. .......................................... 343/17.2 PC
[51] Int. Cl. .............................................. G01s 9/23
[58] Field of Search ............ 343/17.1, 17.2, 17.2 PC

[56] References Cited
UNITED STATES PATENTS

| | | | |
|---|---|---|---|
| 2,624,876 | 1/1953 | Dicke | 343/17.2 |
| 2,678,997 | 5/1954 | Darlington | 343/17.2 |
| 2,753,448 | 7/1956 | Rines | 343/17.2 |
| 3,212,053 | 10/1965 | Finney | 343/17.2 PC |
| 3,320,613 | 5/1967 | Brault et al. | 343/17.2 PC |
| 3,639,695 | 2/1972 | Bertheas | 343/17.2 PC |

OTHER PUBLICATIONS

Proceedings of the IRE, March 1960, pages 310–316, Pulse Compression–Key to More Efficient Radar Transmission.

Primary Examiner—T. H. Tubbesing
Attorney, Agent, or Firm—James K. Haskell; Walter J. Adam

EXEMPLARY CLAIM

6. A ranging system for transmitting wide pulses toward an object in space and for intercepting the wide pulses after reflection from the object to develop narrow pulses comprising an impulse generator for developing a narrow pulse including signal components of a plurality of frequencies, a first rotating magnetic drum, a first write head coupled to said impulse generator and fixedly mounted adjacent to the surface of said first drum for recording the signal components of said first narrow pulse thereon, a plurality of first read heads fixedly mounted adjacent to the surface of said first drum and evenly spaced around the circumference thereof, one of said first read heads being mounted adjacent to said first write head, a plurality of first filters each coupled to one of said plurality of first read heads and having pass bands centered at different frequencies so as to form a continuance sequence of pass bands over a preselected frequency range, said first filters coupled to said first read heads so that a different frequency is passed through during each portion of a cycle of rotation of said first drum equal to the reciprocal of the number of said first read heads, first summing means coupled to said plurality of first filters for developing a wide pulse including a signal having a frequency varying over said preselected range, transmitting means coupled to said first summing means for transmitting said wide pulses into space, receiving means for intercepting said wide pulses, a second rotating magnetic drum, driving means coupled to said first and second drums for rotating said drums at a similar velocity, a second write head coupled to said receiving means and fixedly mounted adjacent to the surface of said second drum for recording the signal of variable frequency thereon, said driving means developing a velocity such that the entire signal of variable frequency is recorded on the circumference of said second drum during one complete cycle of rotation, a plurality of second read heads fixedly mounted adjacent to the surface of said second drum and evenly spaced around the entire circumference thereof, one of said second read heads being adjacent to said second write head, a plurality of second filters each coupled to one of said plurality of second read heads and having pass bands centered at different frequencies so as to form a continuance sequence of pass bands over said preselected frequency range, said second filters coupled to said second read heads so that signals over said preselected range are passed through during a portion of the cycle of rotation equal to the reciprocal of the number of second read heads, second summing means coupled to said plurality of second filters for developing a second narrow pulse during said portion of the cycle of rotation of said second drum when signals are passed through said plurality of second filters, and display means coupled to said summing means for developing an indication of range with a high degree of resolution.

10 Claims, 9 Drawing Figures

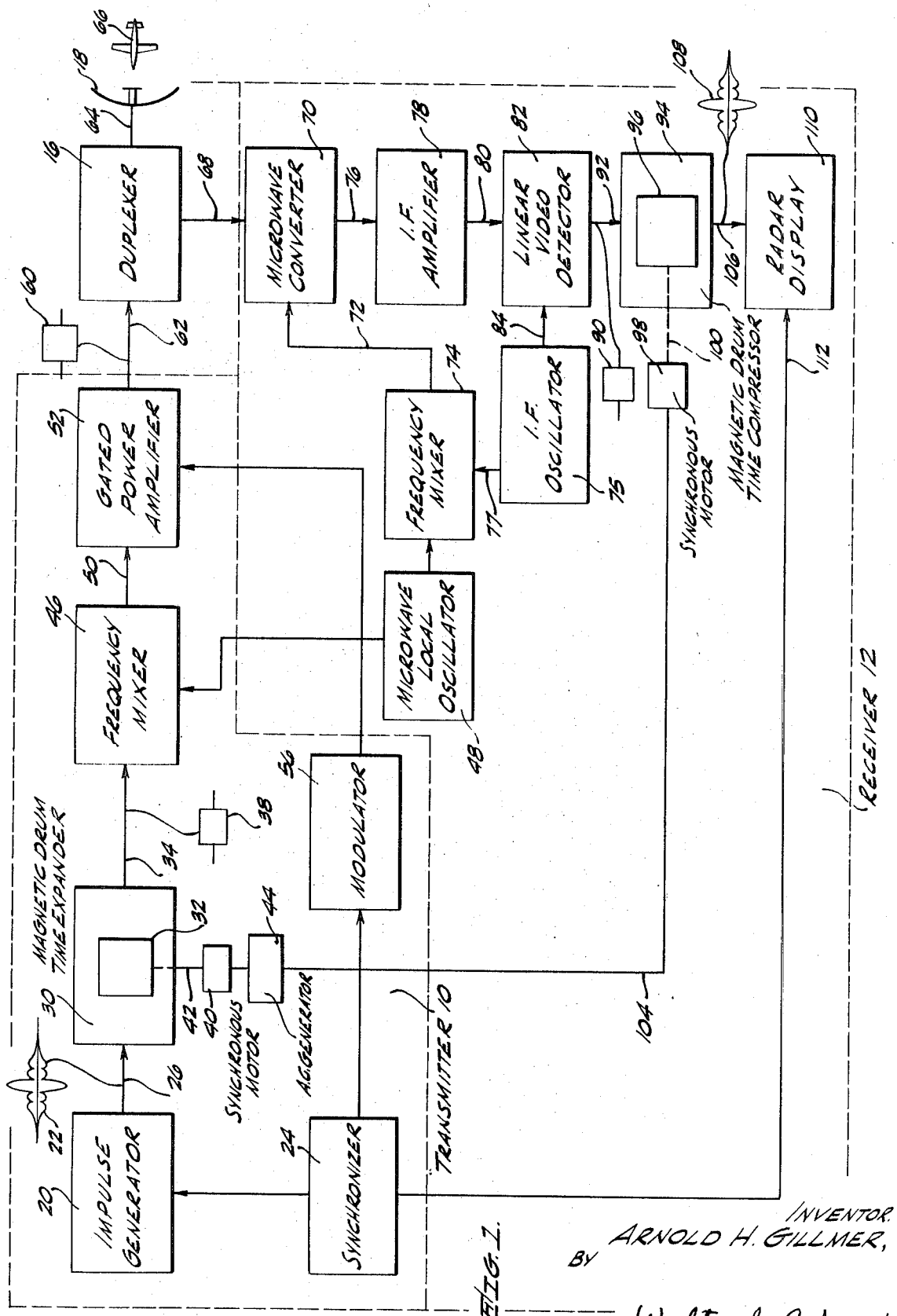

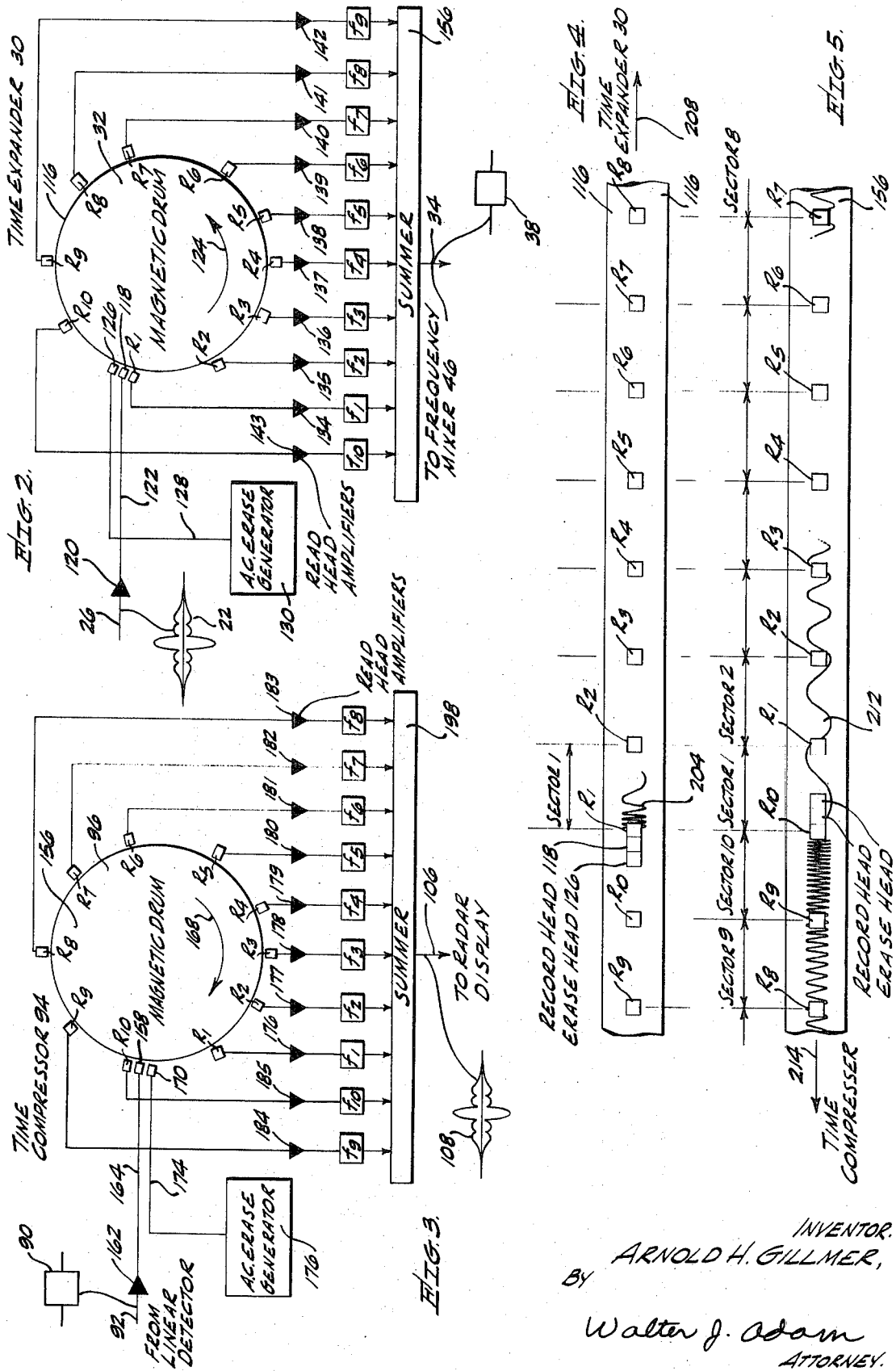

HIGH COMPRESSION RATIO PULSE FORMING SYSTEM

This invention relates to an improved transmitting and receiving system and particularly to a long distance radar ranging system utilizing improved pulse expansion and compression devices for transmitting and receiving pulses with a high information rate and a high average power.

In prior art radar systems designed for operation over long ranges such as in space applications, it is difficult to transmit a signal with a high average power at moderate peak powers and still have a signal that provides good resolution in time. In order to transmit pulses of energy with a high average power, it is necessary that the pulses have a long time duration; that is, be relatively wide pulses. For obtaining high resolution such as for indicating range it is necessary that the pulses at the display be relatively narrow. In order to transmit a wide pulse and to display a narrow pulse, a coding system with a high information rate or a high rate of frequency shift of the carrier signal forming the wide pulse is required. As is well known, pulse width and information rate are reciprocals of each other so that a coding system is required to develop both a high information rate and a wide pulse.

One arrangement that provides both a wide transmitted pulse and a high information rate utilizes frequency shift coding which allows a narrow pulse to be expanded to a wide pulse at the transmitter and the wide pulse to be compressed to a narrow pulse at the receiver. This arrangement requires that at the transmitter, the frequency of the carrier signal is linearly shifted with time by a filter means for a period equal to the width of the wide pulse. At the receiver a matched filter means is required having a time delay that linearly varies with frequency but with a slope opposite to the frequency-time variation of the filter system at the transmitter so that all of the frequency components pile up at a particular point in time to provide the narrow signal compressed in time. In order for a system of this type to provide a high degree of range resolution a large time of duration of the wide pulse times the bandwidth product is required, which product compares the relative width of the wide and narrow pulses. The band of the time-bandwidth product is the frequency band over which the carrier signal of the wide pulse is shifted.

Prior art filter arrangements which have a linearly varying time delay for use in the transmitter and the receiver have many disadvantages such as being limited to relatively low compression ratios, which is the ratio of the width of the wide pulse to the width of the narrow pulse. One prior art filter device that provides a linearly varying time delay is a lumpedparameter all pass dispersive network or lattice. In this lattice approach, as the compression ratio requirement increases, the number of lattices also increases. Because of the finite Q values of the elements of the lattice the amplitude response of a plurality of cascaded lattices is irregular and compensation must be made for this amplitude response. This compensation is accomplished by amplitude equalizers which have nonlinear phase functions and in turn require phase equalizers. The result is a very complex and lossy filter that is unsuitable for high pulse compression ratios.

Another prior art dispersive filter device utilizes a tapped delay line with conventional filters each coupled to a different tap and tuned to adjoining frequencies so as to divide the signal into equal increments of time and frequency. The signals passed through the filters are summed in a linear network to form the output of the dispersive filter device. The time delay variation achieved by this technique is a stepped function as a result of the finite number of taps in the delay line. This approach utilizing a tapped delay line has the disadvantage that it is limited by the spurious reflections and attenuations in the line. Further, large delay requirements result in a very large and bulky delay line.

It is, therefore, an object of this invention to provide a radar ranging system that utilizes high compression ratio pulse coding so as to operate with a large average power and a high degree of resolution in time.

It is a further object of this invention to provide a high compression ratio pulse coding system with a high degree of range resolution for operation at long distances in space that transmits a pulse having both a large width and a high information rate.

It is a still further object of this invention to provide a pulse expansion and compression system utilizing two magnetic drums with the time delay characteristics of the second drum being thhe conjugate of those of the first drum, so as to provide a wide pulse at the first drum with a high information rate and to decode the wide pulse to form a narrow pulse at the second drum.

It is another object of this invention to provide an improved pulse compression and expansion device that utilizes a magnetic drum so as to provide a relatively large time delay-bandwidth product.

It is another object of this invention to provide a high compression ratio pulse coding system for frequency shift coding of information transmitted from one point to another.

According to one feature of this invention, a radar ranging system is provided for transmitting a wide pulse with a large time delay-bandwidth product and to develop a narrow pulse in the receiver so as to determine range with a high degree of resolution. The transmitter portion of the system includes a magnetic drum time expander having a rotating magnetic drum with write head adapted to record signals of a narrow pulse thereon. The narrow pulse includes frequency components over a wide range of frequencies. Evenly spaced around the magnetic drum of the time expander are a plurality of read heads with their output leads coupled to a plurality of filters having different but adjacent pass bands, which filters in turn are coupled to a summing circuit. The signals of the narrow pulse are recorded on a small portion of the circumference of the drum and different frequency components thereof are read during rotation of the drum to pass through the filters so as to provide a time delay varying with frequency. Thus, a wide pulse is developed having a large frequency variation therein and after amplification is transmitted into space with a high average power.

The wide pulse after being intercepted is applied to a time compressor in the receiver portion of the system which includes a conjugate magnetic drum rotating at the same velocity of the drum of the time expander. A write head is provided to respond to the wide pulse and to reocrd the signal of varying frequency around the entire circumference of the drum. Evenly spaced around the conjugate drum are a plurality of read heads each coupled to a filter having a different center frequency, which filters in turn are coupled to a summing network. During one complete cycle of rotation of the conjugate drum the frequency varying signals are written thereon, and during the last portion of the cycle, signals of all frequencies are passed through the filters to form a narrow pulse similar to the narrow pulse supplied to the time expander. Thus, all of the signal components of the transmitted wide pulse are piled up in time at the conjugate drum to develop a narrow decoded pulse that provides a high degree of range resolution. by utilizing the drum arrangement, in accordance with this invention, the time delay or phase characteristics of the conjugate drum are to a high degree of reliability the conjugate of those of the time expander. Therefore, a system has been provided that codes with linear frequency shifting so as to provide long range radar range determination with a high degree of resolution.

The novel features which are believed to be characteristic of the invention, both as to its organization and method of operation, together with further objects and advantages thereof, will be better understood from the following description considered in connection with the accompanying drawings, in which like characters refer to like parts, and in which:

FIG. 1 is a schematic block diagram of the high compression ratio radar ranging system in accordance with this invention;

FIG. 2 is a schematic circuit and structural diagram of the rotating magnetic drum time expander utilized in the system of FIG. 1;

FIG. 3 is a schematic circuit and structural diagram of the rotating magnetic drum time compressor utilized in the system of FIG. 1;

FIG. 4 is a schematic diagram of the surface of the drum for the time expander of FIG. 1 for explaining the construction and operation thereof;

FIG. 5 is a schematic diagram of the surface of the drum for the time compressor of FIG. 1 to explain the construction and operation thereof;

Figure 6:
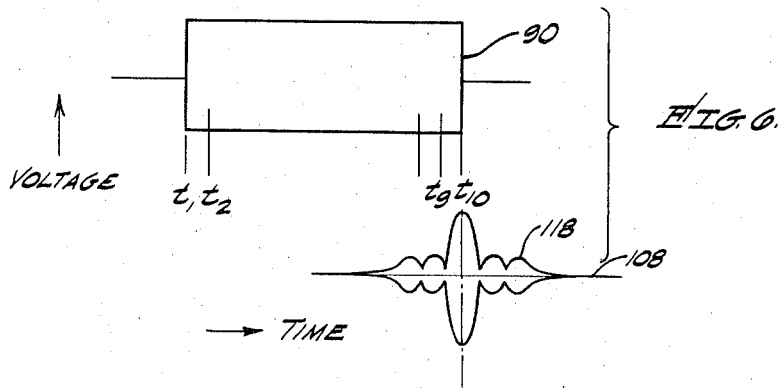
FIG. 6 is a diagram of voltage versus time for explaining the wide pulse and the narrow pulse utilized in the system of FIG. 1.

Referring first to FIG. 1 which is a schematic block diagram of the high compression ratio radar ranging system in accordance with this invention, the arrangement of the elements therein will be explained. The system includes a transmitter portion 10 and a receiver portion 12, as well as a conventional duplexer 16 and antenna 18. The transmitter 10 includes an impulse generator 20 for providing a narrow pulse indicated by a waveform 22 in response to a timing signal from a synchronizer 24. The pulse of the waveform 22 may be a pulse of signals at a selected center frequency including a carrier and components of a plurality of frequencies or, for providing increased power to the system, as will be further discussed, may be a pulse of carrier signals varying in time from a low frequency to a high frequency in a linear manner, for example.

The narrow pulse of the waveform 22 may be developed by any conventional technique such as by applying a short pulse to any suitable low pass filter having a reasonably sharp cutoff characteristic and linear phase characteristics as illustrated by FIG. 92a, Curve 5 at page 218 of "Pulses and Transients in Communication Circuits" by Colin Cherry, published by Dover Publications and copyrighted in 1950. Also, the above mentioned book by Cherry was published in London by Chapman & hall Ltd., 37 Essex Street, W. C. 2 in 1949. Also, the narrow pulse of the waveform 22 may be developed by utilizing a system for the impulse generator 20 as described and shown in FIGS. 6 and 7 of an article, "Pulse Compression - Key to More Efficient Radar Transmission," by Charles E. Cook on page 310 of the March 1960 Proceedings of the Institute of Radio Engineers. The pulse generator shown in FIG. 7 for developing a narrow pulse at intermediate frequency includes a swept pulse generator in which the carrier frequency is linearly swept, a compression filter section which may be the bridged-T all pass network of FIG. 6, and an equalizer which provides conventional phase and amplitude correction. The signal of the waveform 22 has a main lobe and a plurality of side lobes. The main lobe or the central large portion in which the majority of the energy is concentrated is defined as the pulse utilized in the system in accordance with this invention although the side lobes may accompany the pulse. The narrow pulse of the waveform 22 is applied from the impulse generator 20 through a lead 26 to a time expander 30. As will be explained in further detail subsequently, the signal components of the pulse of the waveform 22 are recorded on the surface of a rotating magnetic drum 32 and are then read from the drum processed, and applied to a lead 34 as a wide pulse shown by a waveform 38. The pulses of the waveforms 22 and 38 are bipolar around a reference voltage. To provide rotation of the drum 32, a synchronous motor 40 is coupled by a shaft 42 to the center axis of the drum 32. The synchronous motor 40 is controlled from an alternating current (AC) generator 44.

The wide pulse of the waveform 38 which includes an alternating carrier signal that increases with frequency in time. in a substantially linear manner, as will be discussed subsequently, is applied to a frequency mixer 46 controlled by a microwave local oscillator 48. The frequency mixer 46 mixes the signals of the waveform 38 with a microwave frequency to apply the wide pulse through a lead 50 to a gated power amplifier 52. The amplifier 52 responds to a modulator 56 which, in turn, is controlled by the synchronizer 24 so that the power of the amplifier 52 is utilized only during the period when a pulse is being transmitted. An amplified pulse as shown by a waveform 60 is applied from the power amplifier 52 through a lead 62 to the duplexer 16 and from the duplexer through a lead 64 to the antenna 18 where the pulse is transmitted into space. After the transmitted pulse of the waveform 60 is reflected from an object in space such as a craft 66 it is intercepted by the antenna 18 and applied through the lead 64 to the duplexer 16. The intercepted pulse similar to the waveform 60 except delayed in time, is then applied through a lead 68 to a microwave converter 70 of the receiver 12. The microwave converter 70 responds to signals applied through a lead 72 from a frequency mixer 74 which, in turn, is controlled by the microwave local oscillator 48 and an IF (intermediate frequency) oscillator 75. The mixing action of the converter 70 heterodynes the wide pulse similar to the waveform 60 to a wide pulse at an IF (intermediate frequency), which is then applied through a lead 76 to an IF amplifier 78. The amplified signal from the IF amplifier 78 is then applied through a lead 80 to a linear video detector 82 which, in turn, is controlled through a lead 84 from the IF oscillator 75. The detector 82 mixes the IF signal to develop a wide pulse at a video frequency as indicated by a waveform 90.

The pulse of the waveform 90 is then applied through a lead 92 to a time compressor 94 which includes a conjugate magnetic drum 96 rotating in response to a synchronous motor 98 coupled thereto through a shaft 100. The synchronous motor 98 is coupled through a lead 104 to the AC generator 44 so that the speed of rotation of the drums 32 and 96 are substantially the same. As the drum 96 rotates, the frequency components of the wide pulse of the waveform 90 are recorded on the surface of the drum 96 and are then read from the drum and applied to a lead 106 as a narrow pulse of a waveform 108 which pulse is similar to the narrow pulse of the waveform 22. The narrow pulse of the waveform 108 is then applied through the lead 106 to a radar display device 110 which in turn is controlled through a lead 112 from the synchronizer 24. The pulse of the waveform 108 may be rectified in the display 110 to provide a conventional range display. Because of the narrow width of the pulse of the waveform 108, the range from the antenna 18 to the object such as the craft 66 maybe displayed with a high degree of range resolution. It is to be noted that the drums 32 and 96 are similar in diameter and because of the operation of the synchronous motors 40 and 98, rotate at a similar speed. As will be described in further detail subsequently, this similarily of structure of the time expander 30 and the time compressor 94 results in a highly reliable and simplified high compression ratio pulse coding system utilizing frequency variation for coding.

Referring now to FIG. 2 which is a schematic circuit and structural diagram of the rotating magnetic drum time expander 30, the operation thereof will be further described. The magnetic drum 32 is coated with a magnetic material 116, which type of materials are well known in the art. Fixedly mounted in suitable relation by conventional structure (not shown) and adjacent to the magnetic surface 116 of the drum 32 is a record or write head 118, which write head is well known in the computer art. The lead 26 from the inpulse generator 20 (FIG. 1) is coupled through a write amplifier 120 and through a lead 122 to the write head 118. The drum 32 rotates in a counterclockwise direction as indicated by an arrow 124. Fixedly mounted with suitable structure and evenly spaced around the circumference of the drum 32 are a plurality of read heads $R_1$ through $R_{10}$ with the read head $R_1$ being adjacent to the record head 118 in counterclockwise position. Also fixedly mounted adjacent to the record head 118 in a clockwise position is an erase head 126 which is coupled through a lead 128 from an AC erase generator 130 for erasing recorded signals one cycle after being recorded on the drum 32. In operation, as the drum 32 rotates in the counterclockwise direction, indicated by the arrow 124, the frequency components of the pulse 22 are recorded on the surface thereof. As will be described subsequently, the signal of the pulse 22 is recorded on a fraction of the surface between two read heads such as $R_1$ and $R_{10}$. Thus, while the drum 32 rotates through one revolution, the recorded signal is sequentially read by read heads $R_1$ through $R_{10}$.

As the drum 32 rotates further than one cycle, the recorded information thereon is erased by the erase head 126. Each of the read heads $R_1$ through $R_{10}$ are respectively coupled to read head amplifiers 134 through 143 which in turn are respectively coupled to filters $f_1$ through $f_{10}$. A linear summer network 156 is provided coupled to the filters $f_1$ through $f_{10}$ to combine the frequency components passed therethrough as the drum 32 rotates. The frequency components that occur during the time delay developed by rotation of the drum 32 are combined in summer 156 to form the wide pulse on the lead 34 as shown by the waveform 38. As will be explained in further detail subsequently, during each one-tenth of the time of rotation of the drum 32 signals at a different frequency band are applied to the summer 156 to be combined during the time of rotation of one cycle to form the wide pulse of the waveform 38. The pulse of the waveform 38 includes a frequency variation developed by the filters $f_1$ through $f_{10}$, each having different but adjacent narrow passbands that together cover the entire range of frequency variation in the pulse of the waveform 38. It is to be noted that the narrow pulse of the waveform 22 may include a carrier signal that varies linearly with frequency so that all frequency components are present with a substantially large amplitude. Also the signal of the waveform 22 may be a carrier signal at a center frequency including a plurality of harmonics which are recorded on a surface of the drum 32 so that each of the filters $f_1$ through $f_{10}$ receives signals of their corresponding passband frequencies.

Referring now to FIG. 3 which is a schematic circuit and structural diagram of the rotating magnetic drum time compressor 94, the arrangements of the elements therein will be further described. The conjugate magnetic drum 96 is coated with a magnetic material 156, similar to the drum 32, and the drum 96 has a diameter similar to that of the drum 32. Fixedly mounted in suitable relation by conventional structure (not shown) adjacent to the surface of the magnetic material 156 is a write or record head 158 for recording thereon the alternating signals included in the wide pulse 90. As will be explained in more detail subsequently, the signal of increasing frequency of the wide pulse 90 is recorded around the entire circumference of the drum 96 during one cycle of rotation thereof to a record or write head 158 fixedly mounted by conventional structure (not shown). The signal of the wide pulse 90 is applied from the lead 92 through a conventional read amplifier 162 and through a led 164. Evenly spaced and fixedly mounted around the surface of the drum 96 by conventional structure are a plurality of read heads $R_1$ through $R_{10}$ with the read head $R_{10}$ being adjacent in a clockwise direction from the write head 158. The magnetic drum 96 rotates in a clockwise direction as indicated by an arrow 168. Thus, during one cycle of rotation of the drum 96 after the pulse of the waveform 90 is applied to the write head 158, the read heads $R_1$ through $R_{10}$ read any signals that appears on the drum which are applied from respective read heads to respective read head amplifiers 176 through 185 to a plurality of filters $f_1$ through $f_{10}$. The passbands of the filters $f_1$ through $f_{10}$ are different and adjacent to each other so as together provide a range of frequency over the frequency variation of the carrier signal of the waveform 90.

As the drum 96 rotates more than one cycle the information thereon is erased by an erase head 170 arranged adjacent to the write head 158 in a counterclockwise position therefrom. The erase head 170 is coupled through a lead 174 to an AC erase generator 176, as is well known in the art. A linear summer 198 is provided coupled to the filters $f_1$ through $f_{10}$ to combine the signals passed therethrough. Because of the frequency of the passbands of the filters $f_1$ through $f_{10}$ of the conjugate time compressor 94 relative to the position of the read heads $R_1$ through $R_{10}$, the signals readfrom the surface of the drum 96 and recorded during one cycle of rotation are only passed through the filters $f_1$ through $f_{10}$ during the last one-tenth of the cycle of rotation of the drum 96. These signals at the various frequencies read from the drum 96 and applied to the summer 198 during this short period of drum rotation are thus piled up in time so as to form the narrow pulse of the waveform 108 on the lead 106. Because the drums 96 and 32 have similar dimensions, have a similar number of read heads, and rotate at a similar speed, the time delay and frequency characteristics thereof are readily arranged to be similar but the conjugate, that is with a frequency variation opposite in sign but of the same mangitude, of those of drum 32.

Referring now to FIG. 4 which is a schematic diagram of the surface of the drum 32 of the time expander 30 as well as referring to FIG. 2, the operation of the system in accordance with this invention will be explained in further detail. The magnetic surface 116 for the time expander 30 is linearly shown in FIG. 4 for ease of illustration at the completion of recording the signals of the waveform 22 thereon. Because the drum 32 has no limitations as to its starting time but is continually rotating, the starting time for operation on any signal pulse begins upon the application of the narrow pulse of the waveform 22 thereto. This narrow pulse which includes signal components at a plurality of frequencies is recorded on the surface 116 of a sector 1 as indicated by a representative signal 204. A sector is one-tenth of the circumference of the drum 32 starting at the position of initially recording the signal 204. It is to be noted that the signal 204 is recorded on only a small portion of circumference of the drum 32, this portion being considerably less than one-tenth of the circumference or less than one sector of circumference. As the magnetic surface 116 moves in a direction indicated by an arrow 208 corresponding to the direction of rotation of the arrow 124, the read head $R_1$ reads the recorded signal immediately after being recorded. As the drum 32 continues to rotate, each read head $R_2$ through $R_{10}$ sequentially reads the recorded signal 204 as the signal moves to the fixed position of each read head $R_2$ through $R_{10}$. As each read head $R_1$ through $R_{10}$ reads the recorded signal 204, frequency components are passed through the corresponding passbands of the filter $f_1$ through $f_{10}$ with only one of the filters passing signals during each time interval equal to one-tenth of the time of rotation of one cycle of the drum 32. Because the passbands of the filters $f_1$ through $f_{10}$ have center frequencies which vary in a substantially linear manner from a low frequency to a high frequency, a frequency variation that extends over a relatively long period of time is developed to form the wide pulse of the waveform 38. It is to be noted at this time that the speed of rotation of the drum 32 determines the time delay, that is, a slow speed results in a long time delay, and a wide pulse as shown by the waveform 38. Also, is as well known in the recording art, the peripheral velocity determines the bandwidth, that is, a large bandwidth requires a relatively high peripheral velocity. Thus, it may be seen that the narrow pulse of the waveform 22 is expanded in time to form a wide pulse including a carrier signal of an increasing frequency during one cycle of rotation of the drum 32.

Referring now to FIG. 5 which is a schematic diagram of the magnetic surface 156 of the conjugate drum 96 for the time compressor 94 and referring to FIG. 3, the operation of the system in accordance with this invention will be explained in further detail. The magnetic surface 156 is linearly shown in FIG. 5 for ease of illustration after completion of recording the signals of the waveform 90 thereon. Upon the appearance of the pulse of the waveform 90, the signal varying in frequency from a low frequency to a high frequency is recorded on the surface 156 during one cycle of revolution of the drum 96 as indicated by a representative signal 212. It is to be noted at this time that the speed and diameter of the drum relative to the width of the wide pulse of the waveform 90 are selected so that the recorded signal 212 is written on the surface around the entire circumference of the drum 96. Dividing the circumference of the drum 96 into 10 portions or sectors one through ten starting with the time of application thereto of the pulse of the waveform 90, it is seen that each sector of the surface 156 has written thereon a portion of the signal 212 of a different frequency range. The surface 156 moves in a direction indicated by an arrow 214 representative of the direction of rotation of the arrow 168 of FIG. 3.

As the low frequency components of sector 1 are recorded by the record head 158, the filter $f_{10}$ having a passband at a relatively high frequency is unable to pass any signal components to the summer 198. Also the corresponding filters coupled to the read heads $R_9$, $R_8$ through $R_2$ are unable to pass any signal components to the summer 198. Thus, during nine-tenths of the cycle of rotation of the drum 96 the frequency components of the signal 212 on each sector of the drum do not correspond to the passband frequency of the corresponding filters. It is only during the last one-tenth of the cycle of rotation of the drum 96 that the frequency recorded in each sector on the surface 156 corresponds to the frequency of the passband of the filters $f_1$ through $f_{10}$. Dividing the time of rotation of the drum 96 into ten time intervals starting with the time of application of the pulse of the waveform 90 thereto, it is only after a time $t_9$ that signals are passed to the summer 198. Therefore, it can be seen that all of the frequency components of the recorded signal 212 are read and applied to the summer 198 during a time interval that is equal to a fraction of the time of writing as determined by the number of evenly spaced read heads. Thus, the narrow pulse of the wave form 108 is developed by the summer 198.

Referring now to FIG. 6 which is a diagram of voltage versus time, showing the pulses at the input and the output leads of the time compressor 94 as well as referring to FIG. 1, the operation of the system will be explained in further detail. The wide pulse of the waveform 90 includes the variation from a low frequency to a high frequency of the signal therein as will be explained subsequently. The signal components of the pulse of the waveform 90 are written on the drum 96 between times $t_1$ through $t_{10}$. During the last time portion of the waveform 90 between times $t_9$ and $t_{10}$, the narrow pulse of the waveform 108 is developed by the operation of the time compressor 94 centered at time $t_{10}$. The bipolar pulse of the waveform 108 includes modules such as 118 which are the result of out of phase components applied to the summer 198 (FIG. 3) the in phase components developing the pulse centered at time $t_{10}$. The bipolar pulse of the waveform 108 is then applied to the radar display 110 which recitifies the pulse and utilizes only the positive portion, for example to provide a display of range. It is to be noted that for the time expander 30, the pulse of the waveform 22 is similar to the waveform 108 and the pulse of the waveform 38 is similar to the waveform 90. However, the narrow pulse of the waveform 22 is applied to the time expander 30 at the timer interval between times $t_1$ and $t_2$. The narrow pulse of the waveforms 22 and 108 are required to have a center frequency that is twice the bandwidth of the frequency shift. The wide pulse of the waveform 90 provides a high average power for transmission and the narrow pulse of the waveform 108 provides a high information rate or a high degree of range resolution.

Figure 7:
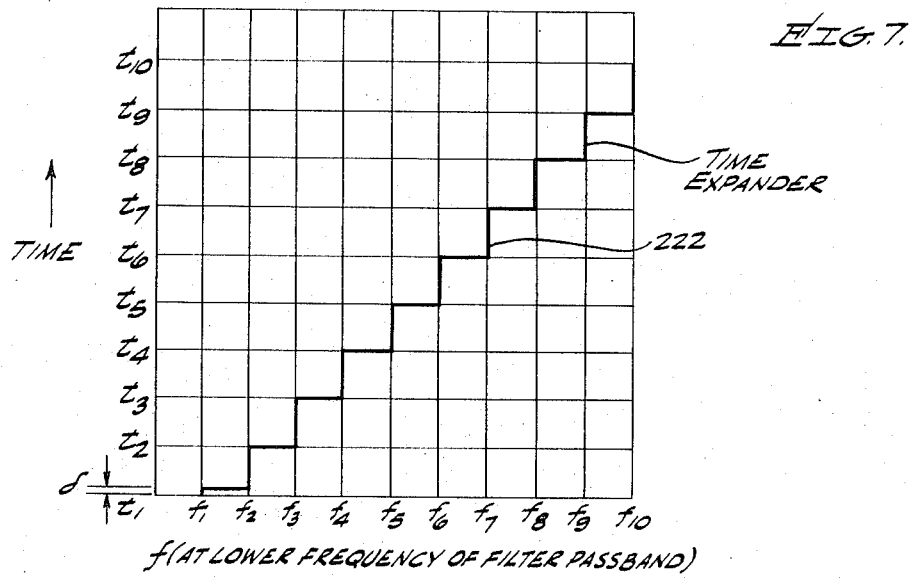
FIG. 7 is a diagram of time from the start of writing on the drum versus frequency at the lower frequency edge of the filter pass bands for the time expander of FIGS. 1 and 2 showing the stepped frequency variation developed thereby.
Figure 8:
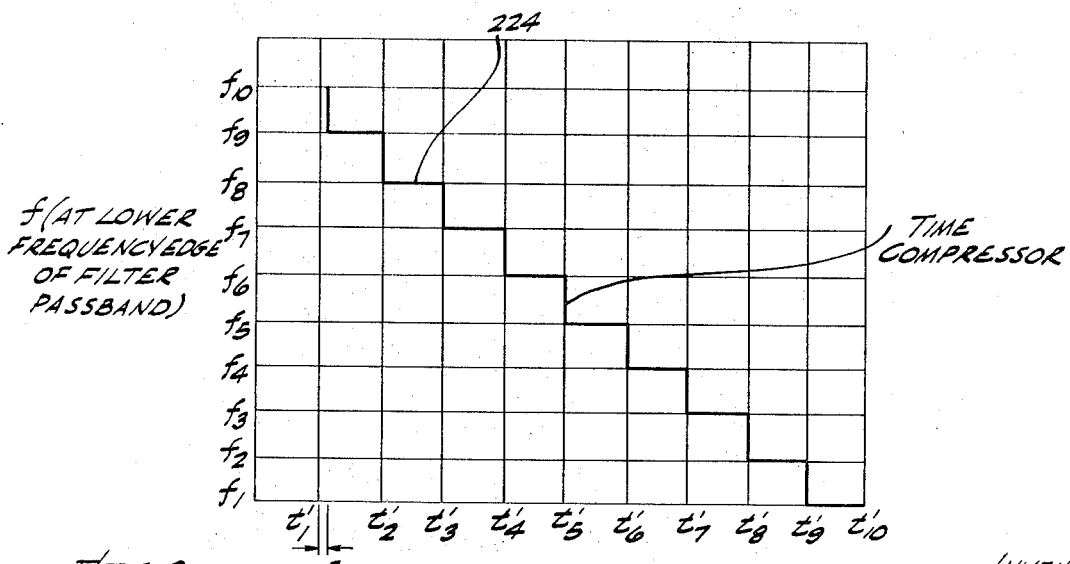
FIG. 8 is a diagram of frequency at the lower frequency edge of the filter pass bands versus time from the start of writing on the drum for the time compressor of FIG. 1 and 3 showing the conjugate stepped frequency variation developed thereby.

Referring now to FIGS. 7 and 8, which are diagrams of time from the start of writing on the drum versus frequency, respectively, for the time expander 30 and the timer compressor 94 as well as referring to FIG. 1, the operation of the system in accordance with this invention will be explained in further detail. The frequency response characteristics of the two drums 30 and 94 satisfy the necessary condition that the time and phase characteristics thereof be the conjugate of each other, that is the frequency variation with time of the time expander 30 and the time compressor 94 be equal but opposite in slope so that appropriate signals become lined up in phase in the time compressor 94. A narrow pulse is thus developed with a minimum of phase variation to provide an unncoded pulse on the lead 106 of the conjugate drum 96. As is well known in network theory, the voltage of a filter may be described as including an amplitude component and a phase component, the phase component including an imaginary term. The conjugate frequency response must effectively reverse polarity of the imaginary term so that the phase components cancel. This requires that the signals are assigned or arranged properly in the time expander 30 and compressor 94. By developing the drums with similar structure and rotating at similar speeds, the system in accordance with this invention readily develops a conjugate frequency time delay response characteristic. The frequency shown in the graphs of FIGS. 7 and 8 are the frequencies of the lower edge of the passbands of the filters $f_1$ through $f_{10}$, these pass bands being adjacent to each other so as to pass a continuous band of signals over the entire frequency range of the carrier signal of the wide pulse shown by the waveform 90.

For the time expander 30, as the time of rotation varies from $t_1$ through $t_{10}$ by dividing one cycle of rotation of the drum 32 from the time of starting to write thereon into ten equal time intervals, the frequency passed through the filters increases to a higher level such as the increase of frequency from $f_1$ to $f_2$ at substantially time $t_1$ as shown by a curve 222. The frequency variation of the curve 222 between $f_1$ and $f_{10}$ which is equal to the information rate of the wide pulse of the waveform 38 is a step function because of the finite number of read heads of the drum 32. For the time compressor 94, the frequency of the signals applied to the filters decreases as the time of drum rotation increases from $t_1^1$ to $t_{10}^1$ such as the decrease of frequency from $f_{10}$ to $f_9$ at substantially time $t_1^1$. This decreasing frequency with increasing time as shown by waveform 224 is also a step function, because of the finite number of read heads of the drum 96. Thus, the frequency response characteristics of the time expander increases with time while the frequency response characteristics of the time compressor 94 decreases in time with a similar but opposite in slope step function as determined by the similarity of the time expander 30 and the time compressor 94. As is well known, combining one device where the frequency increases with time with another device where the frequency decreases with time having exactly similar but opposite characteristics results in a coded signal being decoded to form the original signal.

It is to be noted that in FIGS. 7 and 8, at a small time interval and greater than times $t_1$ and $t_1^1$, the frequency changes from $f_1$ to $f_2$ for the time expander 30 and from $f_{10}$ to $f_9$ for the time compressor 94. This time interval is caused by the small finite distance between the read head and the adjacent write head but does not substantially hinder the operation of the system. The result of the time interval for the time expander 30 is that during the last time interval between $t_9$ and $t_{10}$, all of the low frequency signals are not read and for the conjugate time compressor 94 is that all of the high frequency signals are not read. However, this small error may be eliminated by distributing this distance between the write head and the adjacent read head between the other read heads around the circumference of the drums. Thus, by utilizating these drum arrangements in accordance with this invention, highly reliable decoding is provided with a stepped rather than a purely linear frequency versus time variation. It is to be noted that the impulse generator 20 of FIG. 1 may develop pulses at a rate such that the wide pulses overlap in time with the conjugate drum 96 continually writing and erasing to operate, as discussed above. An example of the operation of the time expander 30 and the time compressor 94 will now be described by selecting a time delay-bandwidth product of one thousand and a pulse width of $12 \times 10^{-3}$ seconds for the wide pulse of the waveform 38. Because the wide pulse of the waveform 38 is developed during one revolution of the drum 32 the speed of rotation of both the drums 32 and 96 is 83.3 revolutions per second. As the time-bandwidth product is one thousand the width of the narrow pulse is $12 \times 10^{-6}$ seconds of duration. The information rate or frequency change between $f_1$ and $f_2$ is $0.833 \times 10^6$ cycles per second. Thus, the range of frequencies of the filters $f$ through $f_{10}$ is $0.833 \times 10^6$ cycles per second. As these conditions determine the conditions for both the drums 32 and 96, the peripheral velocity thereof is 833 inches per second and the diameter of the drums is 3.18 inches. As discussed previously, the speed of the drum must satisfy the frequency response characteristic of the magnetic material thereon so that the peripheral velocity of the drums determines the bandwidth; that is, a high velocity is required for a large bandwidth or information rate. The number of read heads selected determines the reliability of the system as the timebandwidth product is porportional to the area under the curves 222 and 224 of FIGS. 7 and 8. Thus a relatively small number of read heads provides a step function that decreases the time-bandwidth product and the advantages of the system. It is to be noted that the 10 read heads are presented as an example and is not to limit the invention. The bandwidth of both of the filters for the time expander 30 and for the conjugate time compressor 94 for the above example is 83.3 kilocycles per second.

Figure 9:
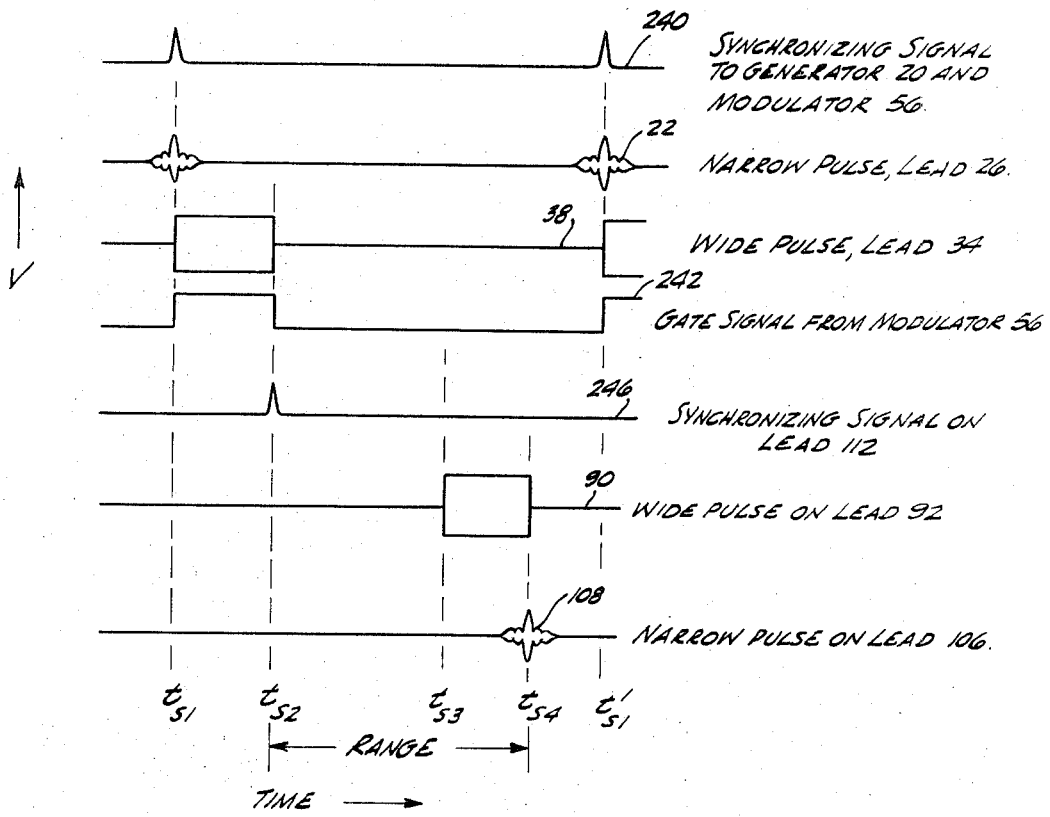
FIG. 9 is a diagram of time versus voltage showing waveforms for further explaining the system in accordance with this invention.

To further explain the overall timing of the system as shown in FIG. 1 in accordance with this invention, a waveform 240 of FIG. 9 shows a synchronizing pulse that is applied from the synchronizer 24 to the impulse generator 20 and to the modulator 56 at a time $t_{S1}$. In response to the pulse of the waveform 240 the narrow pulse of the waveform 22 is applied to the magnetic drum time expander 30 which in turn forms a wide pulse of the waveform 38 which is then mixed and applied to the gated power amplifier 52. In response to the synchronizing pulse of the waveform 240 at time $t_{S1}$, the modulator 56 forms a gate signal of a waveform 242 to gate the pulse of the waveform 38, after mixing, therethrough to form the pulse of the waveform 60 (FIG. 1). Thus, the signal of the waveform 60 is transmitted at time $t_{S1}$ as shown by the waveform 38 and is intercepted at a time $t_{S3}$ by the antenna 18. In order to start a sweep in the radar display 110 at a proper time to provide a range display, a synchronizing pulse of a waveform 246 may be applied from the synchronizer 24 on the lead 112 to the display 110 at a time $t_{S2}$. The delay of the synchronizing pulses of the waveforms 240 and 246 is equal to the width of the expanded pulse of the waveform 38. At a time $t_{S4}$ the leading edge of the intercepted pulse as shown by the waveform 90 is applied to the magnetic drum time compressor 94 to form the compressed pulse of the waveform 108 at the trailing edge thereof. Thus, the range indication may be determined from the time interval between the times $t_{S2}$ and $t_{S4}$. At a subsequent time, for example such as time $t_{S1}$, a synchronizing pulse of the waveform 240 is again applied to the impulse generator 20 and the sequence of operation is again performed.

By using the drum arrangement in accordance with this invention, the system is entirely independent of the time when the pulse generator 20 applies a pulse of the waveform 22 to the time expander 30 or of the delay between transmission from antenna 18 and interception thereby because time of operation starts upon writing information on the drums 32 or 96. One advantage of the drum arrangement in accordance with this invention is that it is easy to match the frequency response of the two devices as conjugates of each other so as to provide highly reliable decoding.

Thus, there has been described a greatly improved system for transmitting coded signals with a wide pulse width having a high average power and a high information rate. The system utilizes rotating drums which are easily matched in frequency response characteristics so that decoding can be performed simply and reliably. Because of this drum arrangement, the system is capable of developing extremely high time delay bandwidth products. The ranging system in accordance with this invention provides a high degree of range resolution for operation over extremely long distances.

What is claimed is:

1. A matched filter system comprising a first and a second magnetic drum continually rotating at a similar speed, a source of first narrow pulses including a plurality of frequency components, a first record head coupled to said source of narrow pulses and fixedly mounted adjacent to the surface of said first drum, a plurality of first read heads fixedly mounted adjacent to the surface of said first drum and evenly spaced around the circumference thereof, first erasing means including a first erase head fixedly mounted adjacent to the surface of said first drum, a plurality of first filters each coupled to a different one of said first read heads and having adjacent pass bands at different frequencies over a preselected frequency range, a first summing means coupled to said plurality of first filters for developing a wide pulse, a second record head coupled to said first summing means and fixedly mounted adjacent to the surface of said second drum, a plurality of second read heads fixedly mounted adjacent to the surface of said second drum, second erasing means including a second erase head fixedly mounted adjacent to the surface of said second drum, a plurality of second filters each coupled to a different one of said first read heads and having adjacent pass bands at different frequencies over said preselected frequency range, and a second summing means coupled to said plurality of said second filters for developing second narrow pulses similar to said first narrow pulses.

2. A system for developing and decoding a wide pulse having a wide bandwidth and including a carrier signal comprising an impulse generator to develop a narrow pulse including a plurality of frequency components, a first rotating magnetic drum, first recording means coupled to said impulse generator for recording the frequency components of said narrow pulse on said first drum, a plurality of first reading means equally spaced around said first drum for sequentially reading the frequency components from said first drum, first filter means coupled to said plurality of first reading means each having a different frequency pass band to sequentially pass signals in response to said reading means over a selected range of frequencies, first summing means coupled to said filter means for developing a wide pulse including signals having a frequency that varies with time, transmitting means coupled to said first summing means for transmitting the wide pulse into space, receiving means for intercepting the wide pulse transmitted into space, a second rotating magnetic drum, driving means coupled to said first and second drums for rotating both said first and second drums at a similar preselected velocity, second recording means coupled to said receiving means for recording the signal of said wide pulse thereon during one revolution of said drum, a plurality of second reading means equally spaced around said second drum for sequentially reading each portion of the signal recorded on said drum, and second filter means coupled to said plurality of second reading means for passing the signals read from said drum during the last portion of rotation of one cycle of drum determined by the number of said plurality of second reading means, and second summing means coupled to said second filter means for responding to the signals read by said second reading means, the time characteristics of said second drum being the conjugate of said first drum so that said narrow pulse developed thereby is similar to the narrow pulse applied to said first recording means.

3. A matched filter system comprising of an impulse generator to develop a narrow pulse including a plurality of frequency components, a first rotating magnetic drum, first recording means coupled to said impulse generator for recording the frequency components of said narrow pulse on a portion of the circumference of said first drum, a plurality of first reading means equally spaced around said first drum for sequentially reading the frequency components from said first drum, a plurality of first filter means each respectively coupled to a different one of said plurality of first reading means for passing different frequency components at times determined by the sequential reading of said first reading means, first summing means coupled to said plurality of first filter means for developing a wide pulse of signals having a frequency that varies with time, a second rotating magnetic drum having a diameter similar to said first drum, second recording means coupled to said first summing means for recording the signals of said wide pulse thereon, driving means coupled to said first and second drums for rotating said first and second drums at a similar velocity such that said wide pulse is recorded on the entire circucmference of said second drum during one revolution thereof, a plurality of second reading means equally spaced around said second drum for reading the signal recorded on said drum, and a plurality of second filter means coupled to said plurality of second reading means for passing different frequency components at a time determined by the reading of frequency components, the second filter means passing signals during a time interval equal to the last portion of one cycle which is the time of one cycle of rotation of said second drum divided by the number of said plurality of second read heads, and second summing means coupled to said plurality of second filter means for developing a narrow pulse, the time delay characteristics of said second drum, said second reading means and said second filter means being the conjugate of the time delay characteristics of said first drum, said first reading means and said first filter means so that said narrow pulse developed by said second summing means is similar to the narrow pulse applied to said first recording means.

4. A matched filter system for converting a first narrow signal pulse to a wide pulse and for decoding said wide pulse to develop a second narrow pulse comprising an impulse generator for developing a narrow pulse including signal components of a plurality of frequencies, a first rotating magnetic drum, a first record head coupled to said impulse generator and mounted adjacent to the surface of said first drum, a plurality of first read heads fixedly mounted and evenly spaced around the circumference of said drum, said first record heads recording the signal components of said first narrow pulse within a sector of the circumference of said drum, the circumference of said drum being divided into a plurality of sectors equal to the number of the plurality of first read heads, a plurality of first filters each coupled to one of said plurality of read heads and having pass bands centered at different frequencies so as to form a continuous sequence of pass bands adjacent in frequency, each of said first filters coupled to a different one of said first read heads so that a different frequency component is passed through said plurality of filters as the sector on which said signal is recorded rotates under a different one of said first read heads, first summing means coupled to said plurality of filters for combining the frequency components passed through said first filter to develop a wide pulse of a signal having a frequency varying with time, a second rotating magnetic drum coupled to said first drum so as to be similar in speed of rotation, a second read head coupled to said receiving means and adjacent to the surface of said drum for recording the signal of variable frequency thereon during one cycle of rotation, a plurality of second read heads mounted adjacent to the surface of said second drum and evenly spaced around the circumference thereof, the circumference of said second drum being dividable into a plurality of equal length sectors, the number being equal to the number of said plurality of second read heads, a signal of a different frequency band being recorded in each sector during one cycle of rotation of said second drum, a plurality of second filters coupled to said plurality of second read heads and each having pass bands centered at a different frequency corresponding to the frequency of the signal recorded in each of said plurality of sectors so as to form a continuous sequence of pass bands adjacent in frequency, said second filters coupled to said second read heads so that signals of all frequencies are passed therethrough during a last time portion of the cycle of rotation equal to the reciprocal of the number of second read heads, and summing means coupled to said plurality of second filters for developing a narrow pulse during the portion of the cycle when signals are passed through said plurality of second filters.

5. A system for transmitting a wide pulse toward an object in space and for intercepting said wide pulse after reflection from the object to develop a narrow pulse comprising an impulse generator for developing a first narrow pulse including signal components of a plurality of frequencies, a first rotating magnetic drum, a first write head coupled to said impulse generator and fixedly mounted adjacent to the surface of said first drum for writing the signal components of said first narrow pulse thereon, a plurality of first read heads fixedly mounted adjacent to the surface of said first drum and evenly spaced around the circumference of said drum, a plurality of first filters each coupled to one of said plurality of first read heads and having pass bands centered at different frequencies so as to form a continuous sequence of pass bands over a preselected frequency range, said first filters coupled to said first read heads so that a different frequency is passed through said plurality of filters during each portion of a cycle of rotation of said first drum equal to the reciprocal of the number of said first read heads, first summing means coupled to said plurality of first filters for developing a wide pulse of a signal having a frequency varying over said preselected range, transmitting means coupled to said first summing means for transmitting said wide pulse toward the object in space, receiving means for intercepting the wide pulse after being reflected from said object in space, a second rotating magnetic drum, driving means coupled to said first and second drums so as to rotate said drums with the same speed of rotation, a second write head coupled to said receiving means and fixedly mounted adjacent to the surface of said second drum for recording the entire signal of variable frequency thereon during one cycle of rotation, a plurality of second read heads fixedly mounted adjacent to the surface of said second drum and evenly spaced around the circumference thereof, a plurality of second filters coupled to said plurality of second read heads and having pass bands centered at different frequencies so as to form a continuous sequence of pass bands over a frequency range equal to the preselected range of the signal of said wide pulse, said second filters coupled to said second read heads so that signals of all frequencies are passed therethrough during one portion of the cycle of rotation equal to the reciprocal of the number of second read heads, and second summing means coupled to said plurality of second filters for developing a second narrow pulse during the portion of the cycle of rotation of said second drum when signals are passed through said plurality of second filters.

6. A ranging system for transmitting wide pulses toward an object in space and for intercepting the wide pulses after reflection from the object to develop narrow pulses comprising an impulse generator for developing a narrow pulse including signal components of a plurality of frequencies, a first rotating magnetic drum, a first write head coupled to said impulse generator and fixedly mounted adjacent to the surface of said first drum for recording the signal components of said first narrow pulse thereon, a plurality of first read heads fixedly mounted adjacent to the surface of said first drum and evenly spaced around the circumference thereof, one of said first read heads being mounted adjacent to said first write head, a plurality of first filters each coupled to one of said plurality of first read heads and having pass bands centered at different frequencies so as to form a continuance sequence of pass bands over a preselected frequency range, said first filters coupled to said first read heads so that a different frequency is passed through during each portion of a cycle of rotation of said first drum equal to the reciprocal of the number of said first read heads, first summing means coupled to said plurality of first filters for developing a wide pulse including a signal having a frequency varying over said preselected range, transmitting means coupled to said first summing means for transmitting said wide pulses into space, receiving means for intercepting said wide pulses, a second rotating magnetic drum, driving means coupled to said first and second drums for rotating said drums at a similar velocity, a second write head coupled to said receiving means and fixedly mounted adjacent to the surface of said second drum for recording the signal of variable frequency thereon, said driving means developing a velocity such that the entire signal of variable frequency is recorded on the circumference of said second drum during one complete cycle of rotation, a plurality of second read heads fixedly mounted adjacent to the surface of said second drum and evenly spaced around the entire circumference thereof, one of said second read heads being adjacent to said second write head, a plurality of second filters each coupled to one of said plurality of second read heads and having pass bands centered at different frequencies so as to form a continuance sequence of pass bands over said preselected frequency range, said second filters coupled to said second read heads so that signals over said preselected range are passed through during a portion of the cycle of rotation equal to the reciprocal of the number of second read heads, second summing means coupled to said plurality of second filters for developing a second narrow pulse during said portion of the cycle of rotation of said second drum when signals are passed through said plurality of second filters, and display means coupled to said summing means for developing an indication of range with a high degree of resolution.

7. A pulse expansion system comprising a source of narrow pulses including signal components of a plurality of frequencies, a rotating magnetic drum, a record head coupled to said source of narrow pulses and mounted adjacent to the surface of said magnetic drum for recording the signal components of said narrow pulse on a portion of the circumference of said drum, a plurality of read heads evenly spaced around the circumference of said drum and mounted adjacent thereto for reading signals recorded thereon, said portion of the circumference on which said signal is recorded being less than the circumferential distance between adjacent read heads, a plurality of filters each coupled to a different one of said read heads, said filters each having different pass bands that together form a continuous sequence of frequency pass bands over a selected range of frequencies, said filters sequentially passing signals of different frequencies over said range as said drum rotates through one cycle after the start of recording the signal of said narrow pulse on said drum, and summing means coupled to said plurality of filters to combine the signals of different frequencies to form a wide pulse including a signal that varies over said selected range of frequencies of said filter pass bands.

8. A pulse compression system comprising a source of a wide pulse of signals at a plurality of frequencies, a rotating magnetic drum, a record head coupled to said source of a wide pulse and adjacent to the surface of said drum for recording the signals of said wide pulse thereon as said drum rotates, said drum rotating with a velocity so that said wide pulse is recorded around the entire circumference of said drum during one cycle of rotation thereof, a plurality of read heads mounted adjacent to the surface of said drum and evenly spaced around the circumference thereof, the circumference of said drum being dividable into a plurality of sectors starting at the point of recording said signal thereon, each sector being a fractional portion of the circumference equal to the reciprocal of the number of said plurality of read heads, a plurality of filters each coupled to a different one of said read heads, each of said filters having a different frequency pass band so as together form a continuous sequence of frequency pass bands over a selected range of frequency, said filters passing signals therethrough during a period when the signal is being recorded in the last sector of the circumference of said drum, and summing means coupled to said plurality of filters for combining the signals of different frequencies during the period when the signal is being recorded in the last sector to develop a narrow pulse.

9. A pulse compression system comprising a source of a wide pulse including a signal having a frequency varying between a first and a second frequency, a rotating magnetic drum, a write head coupled to said source of a wide pulse and adjacent to the surface of said drum for recording the signal of said wide pulse around the entire circumference of said drum as said drum rotates one cycle, a plurality of read heads fixedly mounted and evenly spaced around the circumference of said drum and adjacent to the surface thereof for reading the recorded signal as said drum rotates, a plurality of filters each coupled to a different read head, said filters having pass bands centered at different frequencies to form a sequence of pass bands adjacent in frequency to include the frequency variation of the recorded signal between said first and second frequencies, said filters coupled to said plurality of read heads so that signals of the frequency corresponding to the pass bands of each of said filters are read from said drum during a last portion of the cycle of rotation of said drum equal to the reciprocal of the number of said plurality of read heads, and summing means coupled to said plurality of filters for developing a narrow pulse from the signals passed through said plurality of filters.

10. A pulse coder comprising a source of narrow pulses of signals including a plurality of frequency components, a rotating magnetic drum, recording means coupled to said source and adjacent to said magnetic drum for recording the signals of said narrow pulse on a portion of the circumference thereof, a plurality of read heads mounted adjacent to said magnetic drum for sequentially reading the signals recorded thereon as said drum rotates, said portion of the circumference on which said signal is recorded being less than a distance around the circumference of said drum between adjacent read heads, a plurality of filters each coupled to a different one of said read heads for passing selected frequency bands of the recorded signals when read by said read heads as said drum rotates so that said recorded signal is adjacent to said read heads, and summing means coupled to said filter means for combining the selected frequency bands of the recorded signals in a time sequence determined by said reading means and said filter means to form a wide pulse.

* * * * *